US008505184B2

(12) United States Patent
Pirri et al.

(10) Patent No.: US 8,505,184 B2
(45) Date of Patent: Aug. 13, 2013

(54) METHOD TO MAKE AN ARM FOR THE DISTRIBUTION OF CONCRETE, AND ARM THUS MADE

(75) Inventors: Nicola Pirri, Milan (IT); Davide Cipolla, Cantu (IT); Mauro Marco Cortellini, Rozzano (IT)

(73) Assignee: CIFA SpA, Senago (MI) (IT)

( * ) Notice: Subject to any disclaimer, the term of this patent is extended or adjusted under 35 U.S.C. 154(b) by 1188 days.

(21) Appl. No.: 12/403,802

(22) Filed: Mar. 13, 2009

(65) Prior Publication Data

US 2010/0230371 A1 Sep. 16, 2010

(51) Int. Cl.
*B23P 11/02* (2006.01)

(52) U.S. Cl.
USPC .......... 29/453

(58) Field of Classification Search
USPC .......... 29/525.1, 525.01, 525.02, 428, 469; 217/347; 156/245, 91; 701/50
See application file for complete search history.

(56) References Cited

U.S. PATENT DOCUMENTS

| | | | |
|---|---|---|---|
| 3,087,581 | A | 4/1963 | Pitman |
| 3,947,191 | A | 3/1976 | Milner, Jr. |
| 3,958,977 | A | 5/1976 | Prochaska et al. |
| 4,696,711 | A | 9/1987 | Greszczuk |
| 5,245,770 | A | 9/1993 | Ko et al. |
| 6,309,485 | B1 | 10/2001 | Miyamoto et al. |
| 6,586,084 | B1 | 7/2003 | Paschke et al. |
| 6,692,681 | B1 | 2/2004 | Lunde |

(Continued)

FOREIGN PATENT DOCUMENTS

| | | |
|---|---|---|
| DE | 198 34 772 A1 | 2/2000 |
| DE | 10106427 A1 | 8/2002 |

(Continued)

OTHER PUBLICATIONS

Fuller et al.—"Active Control of Vibration", chapter 3.9, fig. 3.10, Academic Press Ltd. 2006 ISBN 012-269441-4.

(Continued)

*Primary Examiner* — John C Hong
(74) *Attorney, Agent, or Firm* — Novak Druce Connolly Bove + Quigg LLP

(57) ABSTRACT

A method to make an arm for the distribution of concrete, or other material similar to concrete, used on heavy work vehicles, wherein the arm comprises a plurality of segments selectively folding and extendible one with respect to the other. Each segment comprises a main girder and auxiliary elements for connection to adjacent segments or for attachment of movement and/or supporting devices for the pipe that carries the concrete. The method comprises a first step in which each main girder is formed, with a predefined length, by depositing a plurality of layers of pre-impregnated composite material in a female type mold. The method comprises a second step in which the composite material, deposited in layers in the mold in a variable number of layers, is subjected to polymerization. The method comprises a third step in which each main girder is removed from the mold and a fourth step in which the auxiliary elements are associated with each girder so as to form a relative segment. The method comprises a fifth step in which the extendible arm is assembled, connecting the various segments at the respective ends. The cross section of each of the main girders of the segments is substantially constant over the whole length thereof. The female mold consists of one or more elementary molds of equal section, connected in sequence with each other according to the overall length of the main girder to be made.

15 Claims, 6 Drawing Sheets

(56) References Cited

U.S. PATENT DOCUMENTS

| | | | |
|---|---|---|---|
| 6,698,451 | B2 | 3/2004 | Anderson et al. |
| 6,719,009 | B1 | 4/2004 | Bissen et al. |
| 6,755,212 | B1 | 6/2004 | Anderson et al. |
| 6,786,233 | B1 | 9/2004 | Anderson et al. |
| 7,128,094 | B2 | 10/2006 | Anderson et al. |
| 7,143,682 | B2 | 12/2006 | Nissing et al. |
| 2003/0215319 | A1 | 11/2003 | Nurse et al. |
| 2003/0222784 | A1 | 12/2003 | Nurse et al. |
| 2004/0108003 | A1 | 6/2004 | Schwing |
| 2005/0011560 | A1 | 1/2005 | Anderson et al. |
| 2005/0011604 | A1 | 1/2005 | Anderson et al. |
| 2006/0257604 | A1 | 11/2006 | Anderson et al. |
| 2011/0220228 | A1 * | 9/2011 | Maini et al. .................... 137/615 |

FOREIGN PATENT DOCUMENTS

| | | | |
|---|---|---|---|
| EP | 0 297 196 | A1 | 1/1989 |
| EP | 0 895 234 | A1 | 2/1999 |
| EP | 0 968 955 | A2 | 1/2000 |
| EP | 1 353 139 | A1 | 10/2003 |
| EP | 1 772 588 | A2 | 4/2007 |
| EP | 1 801 177 | A1 | 6/2007 |
| GB | 1009711 | A | 11/1965 |
| GB | 2 382 323 | A | 5/2003 |
| GB | 2 387 375 | A | 10/2003 |
| JP | 7-133094 | A | 5/1995 |
| JP | 2000-282687 | A | 10/2000 |
| JP | 2002046993 | | 2/2002 |
| WO | 02/055813 | A1 | 7/2002 |

OTHER PUBLICATIONS

Magni—“Robust Modal Control with a Toolbox for Use with Matlab”, chapter 1.2, figs. 1.3-1.11, chapter 2 and related figures, Kluwer Academic 2002, ISBN 0-306-46773-9.

Italian patent application No. UD2007A000056, filed Mar. 16, 2007, applicant CIFA S.p.A.

Notice of Opposition, Jan. 12, 2012 for EP 2039498 to Pirri et al.

CEMEX-Rechnung (CEMEX bill)—Apr. 28, 2005.

Wikipedia-Auszug betreffend Faserverbundwerkstoff vom Jul. 21, 2007 (Wikipedia excerpt concerning fiber composite material of Jul. 21, 2007), URL:<http:/de.wikipedia.org/w/index.php?title=Faserverbundwerkstoff &oldid=34641046>, retrieved from the Internet Dec. 5, 2011.

Konvolute offenkundige Vorbenutzung Autobetonpumpe S 31 XT, “bundle of prior public use truck-mounted concrete pump S 31 XT” (2007).

* cited by examiner

METHOD TO MAKE AN ARM FOR THE DISTRIBUTION OF CONCRETE, AND ARM THUS MADE

FIELD OF THE INVENTION

The present invention concerns a method to make an arm for the distribution of concrete, or other material similar to concrete, used on heavy work vehicles, such as for example a truck or concrete mixer.

The invention also concerns the distribution arm obtained using said method.

The distribution arm made according to the present invention comprises a plurality of articulated segments, pivoted to each other at the ends. The segments can be disposed in a folded configuration during transportation to the place where they will be used, and a work configuration, in which they are progressively extended according to the length/height to be reached.

BACKGROUND OF THE INVENTION

An arm for the distribution of concrete is known, mounted on heavy work vehicles used in the building sector, as described in the patent application IT UD2007A000056 in the name of the present Applicant.

The distribution arm of the known type comprises segments consisting of a main girder made of composite material, of a normally rectangular section which substantially narrows in its length. The segments also comprise longitudinal and/or transverse stiffening elements and/or for connection to specific equipment. These elements are made of metal or composite material, they are glued to or immersed in the structure of the main girder of the segments.

Applicant, based on the idea of the use of composite material for the construction of said arms, has further developed the construction technique in order to obtain significant reductions in the costs of production, in particular in the design and construction of the relative molds and models, and to allow maximum flexibility and versatility in production for assembly on different types of vehicles according to the specific requirements.

Another purpose obtained with the present invention is to simplify maintenance operations of the distribution arm during normal working activity.

Another purpose is to allow great flexibility in the choice of the length, resistance and rigidity of the segments of the arm, allowing to vary on each occasion one and/or the other of said parameters according to specific requirements and requests.

Another purpose is to allow easy modification both of the articulation centers of the individual arms, and also the position of the attachment of the relative movement cylinder without modifying the models and molds of the main girder.

The Applicant has devised, tested and embodied the present invention to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the method according to the present invention comprises a first step in which each main girder of each segment of arm is formed, with a predefined length, by depositing a predefined plurality of layers of pre-impregnated composite material in a female forming mold.

According to a characteristic feature of the present invention, the cross section of each main girder, of predefined length, is constant over its whole length.

In this way, the productive flexibility is considerably increased with respect to known solutions, since it is possible to modify, relatively easily and quickly, both the length of the girder to be produced and also the density of the layers, according to needs and specific requirements, simply by using a variable number of elementary molds of equal section and connected with each other in sequence.

Thanks to this, once a determinate dimensional class of the main section has been chosen, the invention allows to make the models and molds relating to a corresponding main girder in a definitive manner.

According to the invention therefore, using the same molds it is possible to vary the resistance and rigidity of the girder obtained, for example by varying the number of layers of composite material used, and therefore to use for different arms the same molds for main girders which differ not only in length but also in load capacity.

According to a first embodiment, the section of the girder is substantially rectangular or square.

In another embodiment, the section is trapezoid in order to accentuate the contact pressure between the glued surfaces.

Moreover, according to another variant, the connection radii are very large, equal to almost 1.5-2 times the thickness of the layer, to facilitate removal from the molds.

The method according to the present invention also comprises a second step in which the composite material, deposited in layers in the mold, is subjected to polymerization, for example by treatment in an autoclave or in another similar known manner.

The method then comprises a third step in which each main girder is removed from the mold, and a fourth step in which, on each main girder, auxiliary elements are attached, thus forming a relative segment, for connection to adjacent segments or for the attachment of movement and/or support devices for the pipe that carries the concrete.

In a preferential embodiment, said elements for connection to auxiliary equipment or adjacent segments, and/or said elements for attachment of the concrete pipes, are made starting from a male mold so that the reciprocal contact surfaces with the main girder are substantially smooth.

The method also comprises a fifth step in which the extendible arm is assembled, connecting the various segments at the respective ends.

In one embodiment of the invention, the first step comprises, during the molding step and between the layers of composite material, in correspondence with at least one end of the segment, the insertion of inserts and/or reinforcements, made of metal or composite material, able to allow to connect the segment to a segment immediately before it or after it.

According to a variant, in the fourth step the connection elements to adjacent segments and/or the attachment elements of the movement devices are glued onto the relative anchorage zones of the segments, for example using a technique of gluing with the suction of the air bubbles: this is facilitated by the angles in the case of a trapezoid geometry.

In addition to gluing, a mechanical coupling can also be used, such as riveting or suchlike, to make the coupling more stable and secure.

According to another variant, the mold used in the first molding step comprises at least one end conformed so as to obtain a shape suitable for direct connection with an adjacent segment, therefore without needing auxiliary elements.

According to another variant, in the molding step steel blades are inserted into the mold, after the layers have been deposited, which are subsequently used for connection with an adjacent segment.

According to another variant, the mold used in the first step comprises elements for the attachment of a movement device to move the segments.

According to a preferential embodiment, the composite material used is of the woven unidirectional type of low modulus carbon.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

With reference to the attached drawings, a method according to the present invention is used to make an extendible arm 10 able to distribute concrete or analogous material for the building trade, mounted on a heavy work vehicle.

Figure 1:
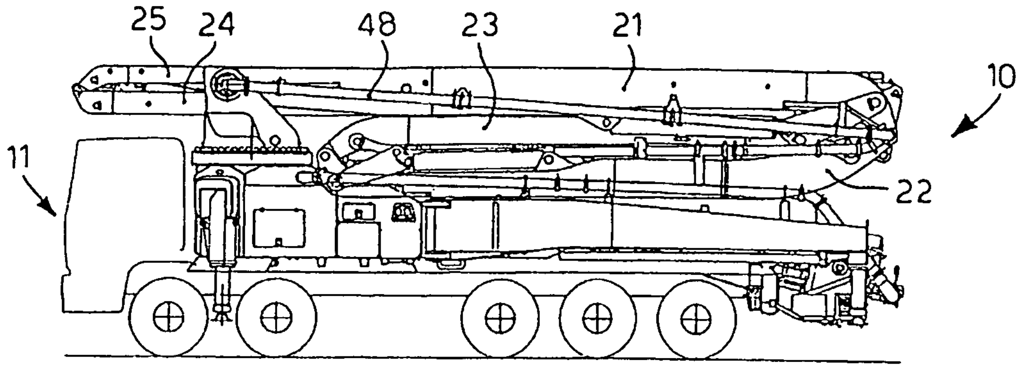
FIG. 1 is a lateral view of a heavy work vehicle on which an extendible arm according to the present invention is mounted, in a folded operating transport condition.

FIG. 1 shows an extendible arm 10 mounted on a heavy work vehicle 11, in a folded position for transport. The extendible arm 10 made using the present invention comprises a plurality of articulated segments, in this case five segments 21, 22, 23, 24 and 25, pivoted at the respective ends.

Each segment 21-25 comprises, at least one of the ends, an element connecting it to the segment immediately before or after, or to a part of the frame of the heavy vehicle.

One or more segments 21-25 is obtained by making a box-like main girder 20, made of composite material, in particular pre-impregnated fibrous material deposited in successive layers, using a female mold with a constant section, rectangular or preferably slightly trapezoid, with an inclination of the vertical sides with respect to the horizontal sides comprised between 0.3 and 1.5°.

The female mold used advantageously consists of a plurality of elementary molds with a constant section, connected to each other in sequence, for example flanged, until the desired length of the main girder 20 is obtained.

The molds are all equal, and can thus be made starting from the same model, with obvious savings.

Figure 2:
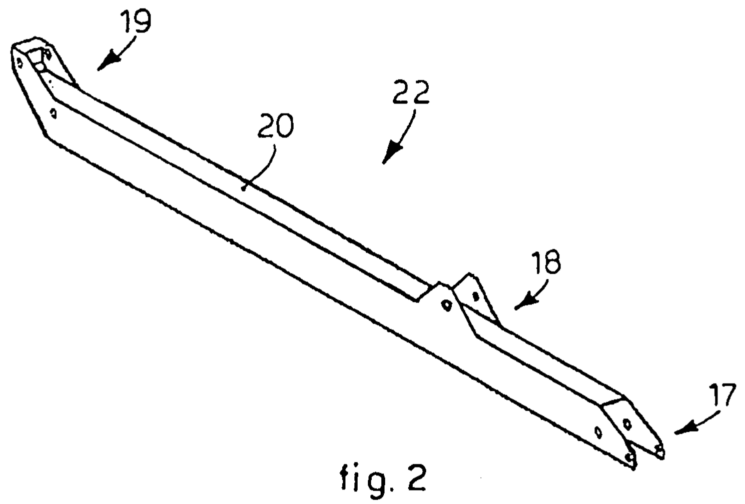
FIG. 2 is a three-dimensional view of a segment which forms the arm made according to the invention.
Figure 3:
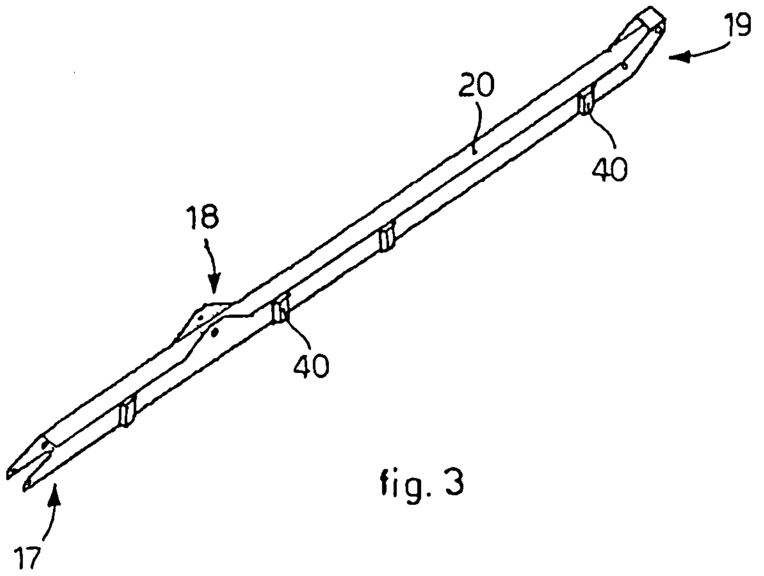
FIG. 3 is a right three-dimensional view of a segment which forms the arm made according to the invention.

In the embodiment shown in FIG. 2, which shows an example of a segment 22, the attachment 19 connecting it to the previous segment, and the attachment 18 connecting it to the movement cylinder, and the attachment 17 connecting it to the subsequent segment are all associated with the girder 20 made of composite material with a substantially rectangular section.

Figure 4:
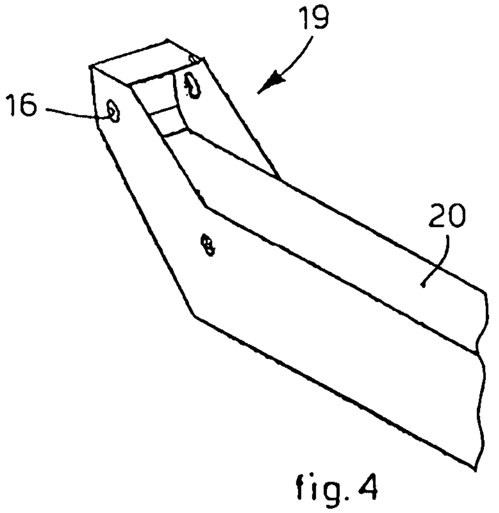
FIG. 4 is an enlarged three-dimensional view of a first detail of the segment of arm in FIG. 2.
Figure 5:
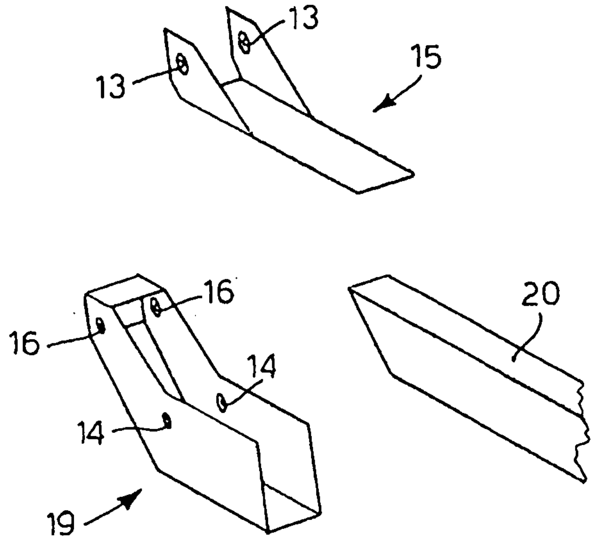
FIG. 5 is an exploded three-dimensional view of FIG. 4.

With reference to FIG. 4 and the exploded detail of FIG. 5, the attachment 19 connecting to the previous segment is made separately of a composite material, preferably from a male mold, so that the reciprocal contact surfaces with the girder 20 are smooth and their position is independent from the thickness of the layers both of the attachment and of the main girder. The attachment 19 has first holes 16, distant from the axis of the truncated box-like profile that forms the main girder of composite material, so that a connection pin can be inserted to connect with the adjacent segment. The attachment 19 also has second holes 14 for coupling with the segment 22 by means of the linkages interposed.

In particular, the attachment 19 is glued to the main girder 20 that forms the segment 22, advantageously with simultaneous aspiration of the air bubbles. In this case, it is provided to insert a reinforcement 15, made of metal or also of composite material, associated during the molding step, for example by gluing, with the terminal part, suitably conformed, of the segment 22.

The reinforcement 15 has holes 13 which allow to insert a possible pin or rivet which makes the coupling of the attachment 19 and girder 20 even more stable.

In the preferential embodiment, to guarantee better alignment, the holes 14 of the attachment 19 and the holes 13 of the reinforcement 15 are made after the elements 19 and 15 have been glued to the end of the main girder 20, and then the join pin is inserted through said holes and those that are formed in the girder 20.

According to a variant, the mold of the segment 22 is already provided conformed for the formation of the attachment 19, and any possible variations in the density of the layers are provided to reinforce the zone subject to great stresses.

Figure 6:
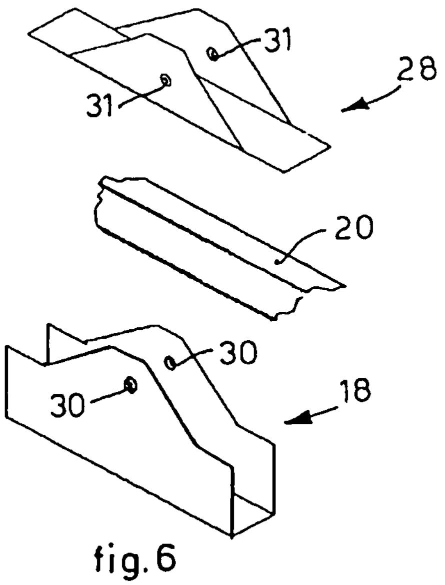
FIG. 6 is an exploded three-dimensional view of a second detail of FIG. 2.

As far as the attachment of the cylinder 18 is concerned, as shown in the exploded detail in FIG. 6, it too can be made separately, of metal or composite material, and then glued to the girder that forms the segment 22, with the possible insertion of a reinforcement 28 inserted into the mold before the polymerization process, and the addition of a possible consolidating pin or rivet, with mating holes 30, 31 being made both on the attachment 18 and on the reinforcement 28, after gluing to the girder 20, for said pin or rivet.

Figure 7:
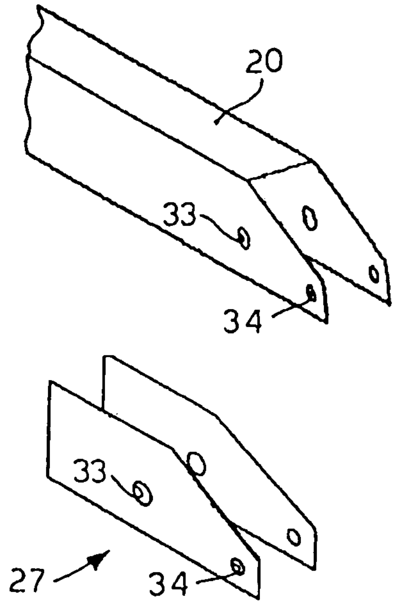
FIG. 7 is an exploded three-dimensional view of a third detail of FIG. 2.

With reference to FIG. 7, the connection attachment 17 to the subsequent segment is obtained by shaping directly the terminal end of the box-like girder 22, possibly modifying locally the disposition and number of the carbon layers. A reinforcement 27 may also be provided, inserted into the mold before the polymerization process, with relative mating holes 33, 34 for possible connection pin or rivets.

FIGS. 10 to 13 show a cross section (partial in FIG. 12) of a segment 21-25.

Figure 10:
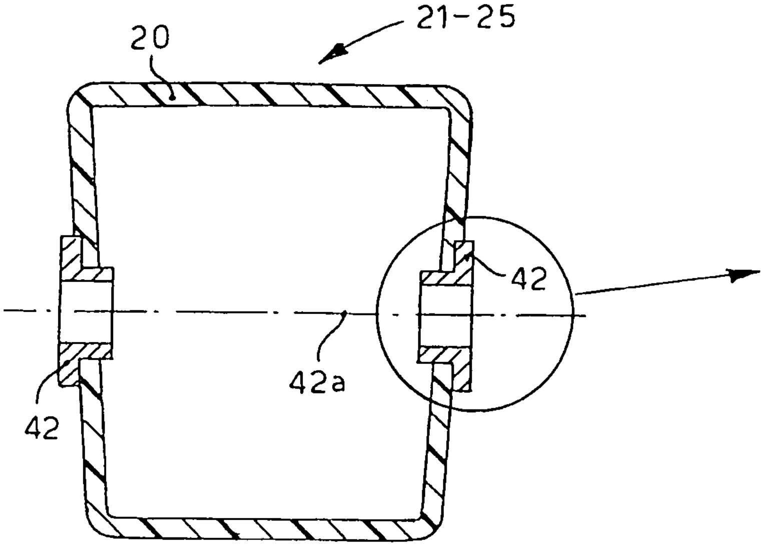
FIG. 10 is a cross section of a segment of arm made according to the invention.
Figure 10A:
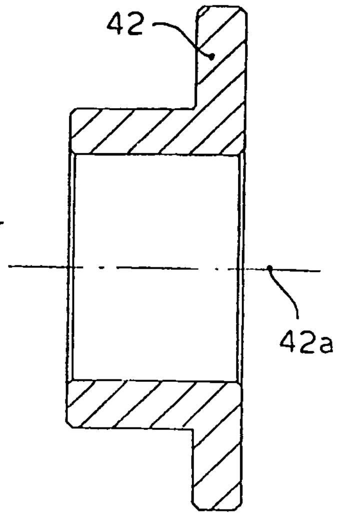
FIG. 10*a* shows a detail of FIG. 1.
Figure 11:
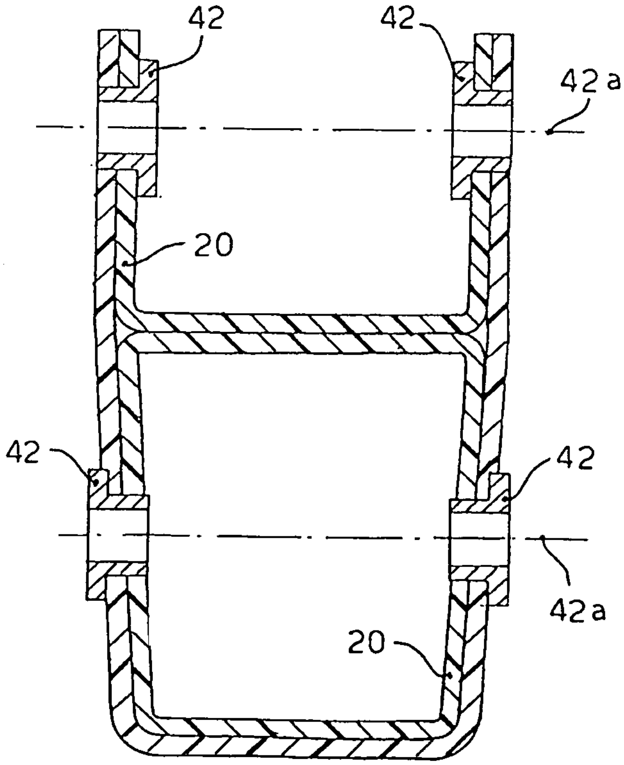
FIGS. 11, 12 and 13 show variants of FIG. 10.

As can be seen in FIG. 10, on one or both the walls, vertical during use, of the segment 21-25 there are bushings 42 made of metal material. The bushings 42 have an axial hole 42*a* which defines the positioning seating of the pins (not shown) of reciprocal connection between the segments 21-25 of composite material.

The bushings are preferably made of a metal material resistant to corrosion and are inserted during the molding step into suitable through holes made in said vertical walls.

In particular, the bushings 42 can be applied both on the box-like girder 20 of the relative segment 21-25, and also on the connection attachments 17, 18 and 19, and clamped with respect to the walls of composite material by gluing.

According to the invention, the metal bushings 42 are glued finished, so that it is not necessary to machine work the bushings 42 in a subsequent step.

Figure 12:
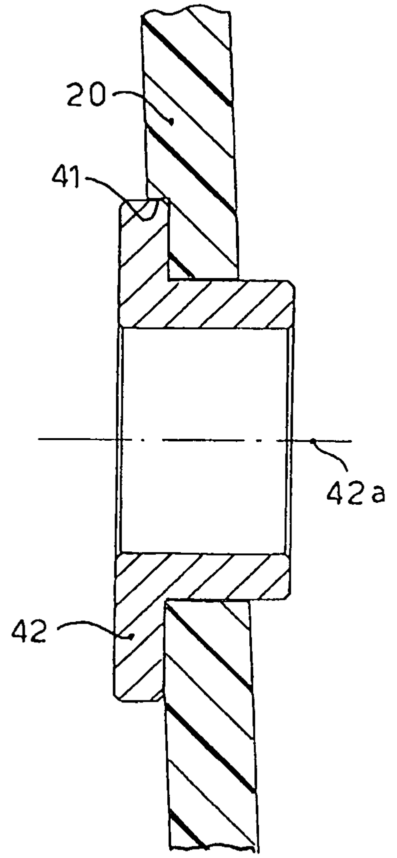

According to a particular feature of the present invention, to respect the orthogonal disposition of the axis 42*a* of the bushings 42 and the axis of the girder 20, millings or borings 41 are made (as can be seen in FIG. 12) on the lateral faces of composite material, which are inclined due to requirements of removing the products from the molds.

Figure 8:
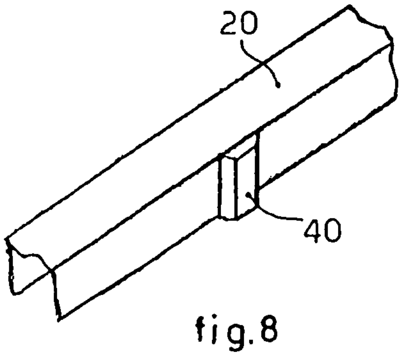
FIG. 8 is a three-dimensional view of a detail of FIG. 3.
Figure 9:
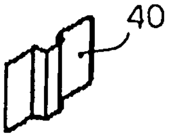
FIG. 9 is an enlarged detail of FIG. 8.

With reference to FIGS. 8 and 9, an auxiliary element 40 is provided to support the pipe 48 that carries the concrete.

In particular, in this case, the auxiliary element 40 consists of an omega-shaped element, advantageously with a constant section, made of composite material or metal, which is glued and possibly riveted to the box-like girder.

The omega element defines a gap for the pipe, and can be connected by means of rivets to the main girder 20.

Since it has a constant geometry, the omega element 40 can be obtained from a mold and cut into several pieces to obtain the desired height. Thanks to this, it is possible to use the same mold for the attachments of the pipe of any other segment with a constant section.

The omega elements 40 have holes, advantageously in the central zone, for connection to a counter plate attached to the pipe that has to be associated with the specific segment.

Figure 13:
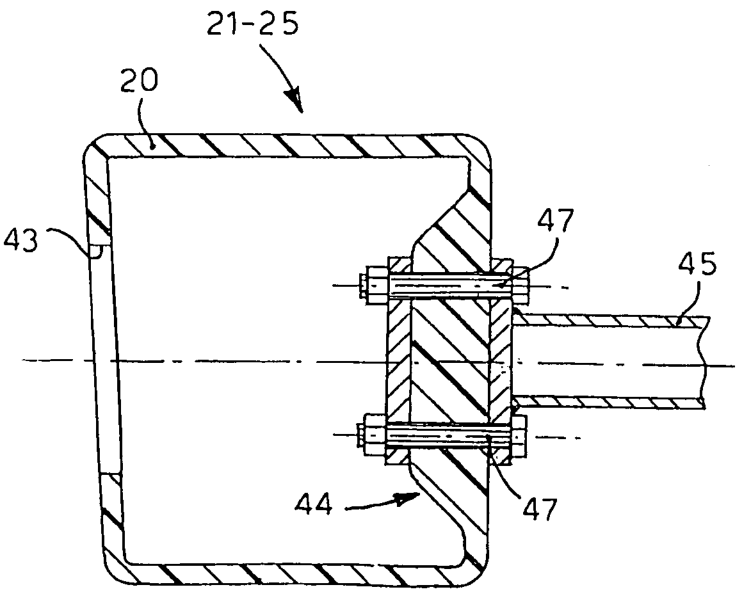

According to a variant of the present invention, shown in FIG. 13, the attachment of the support 45 for the concrete pipe 48 is made by thickening locally, during the depositing of the layers of composite material, a corresponding zone 44 of a vertical wall of the box-like girder 20.

The thickened zone 44 can then be suitably holed to insert attachment screws 47 of said support 45 of the pipe 48.

To allow the screws 44 to be tightened, an access hole 43 is made on the vertical wall of the girder 20 opposite the support 45.

It is clear that modifications and/or additions of parts may be made to the method and arm to distribute concrete as described heretofore, without departing from the field and scope of the present invention.

The invention claimed is:

1. A method for making an arm for the distribution of concrete or other similar material by a work vehicle, said arm comprising a plurality of segments each selectively foldable and extendible with respect to others of said plurality of segments, each of said segments comprising a main girder and auxiliary elements for connection to adjacent segments or for attachment of movement and/or supporting devices for a pipe that carries the concrete or other similar material, the method comprising:

forming each of a plurality of main girders with predefined lengths, by depositing a plurality of layers of pre-impregnated composite material in a female type mold, wherein a number of layers of said plurality of layers varies according to a desired resistance and/or rigidity of the main girder formed thereby;

subjecting the deposited composite material to polymerization;

removing each main girder from its mold, associating auxiliary elements with each girder so as to form a relative segment;

assembling the extendible arm by connecting the various segments at respective thereof, wherein a cross section of each of said main girders of said segments is substantially constant over the whole length thereof and wherein said female mold comprises a number of elementary molds of equal section, connected in sequence with each other according to the overall length of the main girder to be made.

2. The method as in claim 1, wherein said constant section is substantially rectangular.

3. The method as in claim 1, wherein said constant section is substantially trapezoidal, with an inclination of sides thereof at an angle between 0.3° and 1.5°.

4. The method as in claim 1, wherein said auxiliary elements are made of composite material and are obtained using a male type mold.

5. The method as in claim 1, wherein said polymerization is performed in an autoclave.

6. The method as in claim 1, wherein forming each of said plurality of main girders further comprises the insertion of metal inserts and/or reinforcements between layers of composite material to allow connection of the segment to an adjacent segment.

7. The method as in claim 1, wherein forming each of said plurality of main girders further comprises the making of holes, on at least one of the sides of a girder, for the positioning of metal bushings for the insertion and positioning of connection pins between the segments.

8. The method as in claim 1, wherein forming each if said plurality of main girders further comprises the making of a thicker part, in at least one zone of the perimeter of a girder, for the positioning of a support for said pipe.

9. The method as in claim 1, wherein said auxiliary elements are attached on each girder so as to form a relative segment.

10. The method as in claim 1, wherein the production of said auxiliary elements comprises the insertion of metal inserts and/or reinforcements between layers of composite material to allow the connection of the segment to an adjacent segment.

11. The method as in claim 1, further comprising gluing connection elements to adjacent segments and/or the attachment elements of the movement devices onto the relative anchorage zones of the segments.

12. The method as in claim 11, wherein said gluing is associated with an aspiration of air bubbles.

13. The method as in claim 12, wherein said gluing is associated with mechanical connection by means of riveting.

14. The method as in claim 1, wherein the mold used in the forming of a girder comprises at least an end conformed so as to obtain a shape suitable for direct connection between adjacent segments.

15. The method as in claim 1, wherein the composite material used is of a woven and/or unidirectional type made of low modulus carbon.

* * * * *

UNITED STATES PATENT AND TRADEMARK OFFICE

CERTIFICATE OF CORRECTION

PATENT NO. : 8,505,184 B2
APPLICATION NO. : 12/403802
DATED : August 13, 2013
INVENTOR(S) : Nicola Pirri et al.

It is certified that error appears in the above-identified patent and that said Letters Patent is hereby corrected as shown below:

In the Claims:

Claim 1, Column 6, Line 7 should read: “segments at respective ends thereof,”

Signed and Sealed this
Seventeenth Day of September, 2013

Teresa Stanek Rea
*Deputy Director of the United States Patent and Trademark Office*